United States Patent Office 3,264,288
Patented August 2, 1966

3,264,288
3-ω-ALKYNYL ETHERS OF ESTRONE AND ESTRONE 17-KETALS
James F. Fisher, Winter Haven, Fla., and Leland L. Smith, Malvern, Pa., assignors to American Home Products Corporation, New York, N.Y., a corporation of Delaware
No Drawing. Filed June 4, 1964, Ser. No. 372,680
3 Claims. (Cl. 260—239.55)

The present invention relates to new 3-ethers of estrone and estrone 17-ketals which are useful in lowering cholesterol concentration of serum in mammals.

A principal object of our invention thus presented is to disclose certain novel steroids having the general formula:

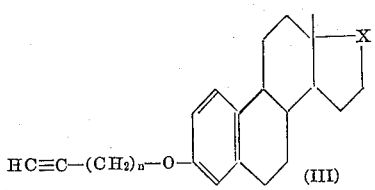

wherein X represents a member selected from the group consisting of alkylenedioxymethylene, alkylenethioxymethylene and alkylenedithiomethylene. It is intended by the definition of alkylenedioxymethylene, alkylenethioxymethylene and alkylenedithiomethylene as employed herein to define X to embrace any and all forms of such ketals which can contain up to about 6 carbon atoms but preferably 2 carbon atoms. The term alkylenethioxymethylene involves those ketal substituents wherein one oxygen atom has been replaced by sulfur atom while the alkylenedithiomethylene involves those ketals wherein both oxygen atoms have been replaced by sulfur atoms. The symbol $n$ in the above general formula is intended to represent a whole integer from 1 to 3 so as to embrace such groups as 2-propynyloxy, 3-butynyloxy, 4-pentynyloxy and the like.

As a second object our invention comprehends certain novel intermediate compounds produced in the course of synthesis of the steroids generally illustrated above. It should be pointed out that these novel materials in some cases have themselves demonstrated potent activity in the area of shifting of lipids from the blood of mammals.

These novel intermediate materials may be represented by the structural formula:

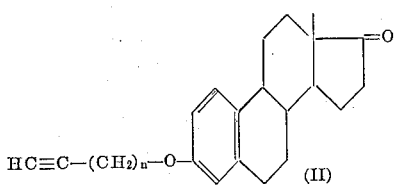

wherein $n$ has the same values as indicated above.

An additional object of our invention which comprises the process aspect of our discovery is to disclose a means of preparation of the novel 3-alkynyl ethers of estrone and estrone 17-ketals indicated above.

These and other objects of the invention will become apparent as our description of our preferred mode of operation proceeds below.

As concerns the methods aspect of our invention therefore it should be clearly understood that while the final products represented by (III) above may be prepared by more than one mode of synthesis we have a preferred mode of preparation. Our preferred mode of synthesis involves the use of the known starting material estrone to wit:

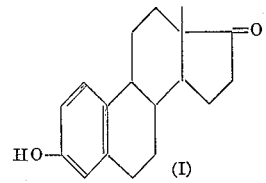

which is alkynylated by reaction with such reagents as 3-bromopropyne, 3-chloropropyne, 4-bromobutyne, 4-chlorobutyne and the like in the presence of an organic solvent such as methanol while during reflux the pH of the system is maintained around 8–9 to yield a crystalline material ultimately analyzed to have the structure:

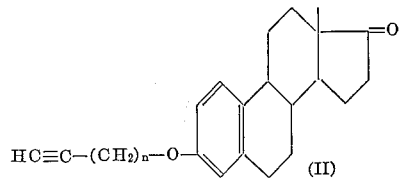

which was purified by conventional techniques and constitutes a novel intermediate which has similar biological action; to the final products.

Treatment of this novel intermediate with a suitable ketalizing agent such as a lower alkylene glycol in the presence of para-toluenesulfonic acid, which is our preferred ketalizing agent for this reaction, affords the final product (III).

The final products of our invention are generally characterized as being white crystalline solids which are soluble in lower aliphatic alcohols. Upon structural analysis these products are found to conform empirically with the graphic structure postulated for them. This is also true for the novel intermediate which is isolated in crystalline form.

The preferred mode of synthesis of our new compounds may be illustrated by the following sequential flow diagram.

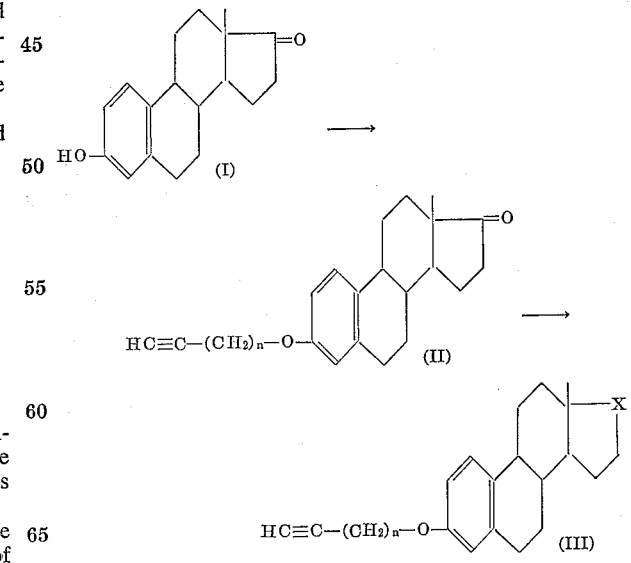

wherein $n$ and X have the values assigned to them above. This process generality is more concretely embodied in the several following particularizing illustrative examples demonstrating formation of several of our preferred compounds. As an alternative mode of preparation the starting material may be directly ketalized to the 17- ketal in the presence of an inert solvent such as benzene, toluene, xylene, etc., at a reaction temperature limited only by the reflux temperature of the solvent over a period of from about 2 to 24 hours' duration to complete ketalization. The method is shown schematically:

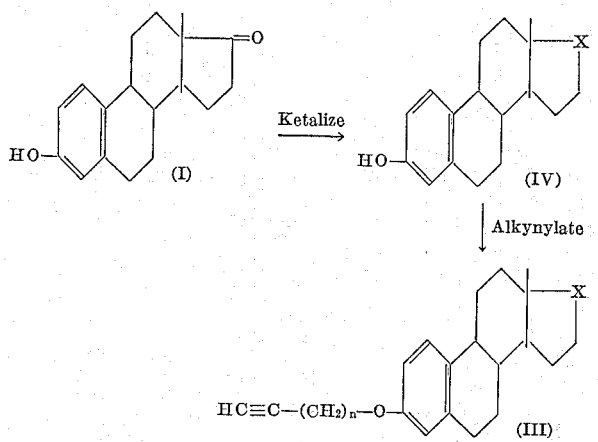

In our methods of preparation as depicted above where it is desired to prepare the 17-substituted hemithioketal instead of the alkylenedioxy type a reagent such a thioethanol is substituted for alkylene glycol in the ketalizing step of the synthesis. In the same manner, where a dithioketal is desired, a reagent such as ethanedithiol is substituted for the alkylene glycol employed in the ketalizing steps.

As suitable alkynylating agents for our preparation of our novel steroids we may employ such known reagents as 3-bromopropyne, 3-bromopentyne, and 3-bromobutyne to name a few of such materials which we would consider adequate to incorporate in the mode of our synthesis.

In the preparation of the 17-ketals of the invention as illustrated above only one of a plurality of possible methods of ketalization has been disclosed. It should be understood that within the general framework of the invention other alternative means of ketal formation may be employed if desired. For instance the process of 17-ketalization to form these novel compounds may be carried out by an exchange reaction which is known as exchange ketalization. In this method the 17-ketone to be ketalized is contacted with the ketal of another carbonyl compound such as the ethylene ketal of acetone, methylethyl ketone, mesityl oxide or the like in the presence of an acidic catalyst to effect a transfer of the ketal function from the latter compound to the former one. This reaction may be conducted either in the presence or absence of heating as specific conditions dictate.

It should further be noted that the present invention also comprehends the preparation of so-called "open chain" 17-ketals wherein the carbon atoms attached to the oxygen or sulfur atoms are not in fact joined together. However, the preparation of compounds such as these will become clear to those skilled in the art after consideration of the foregoing disclosure.

The compounds of the invention are useful in the field of intermediates for further steroid synthesis in preparing new steroidal compounds. In addition, the compounds of the invention have been found to demonstrate antilipemic properties coupled with lowered estrogenic action. Also, besides having capacity to regulate blood lipids, the compounds are useful for their general hormonal effect, particularly in the female. Therefore many of the compounds would be expected to exhibit utility in those areas where estrogens are employed, such as female hypogonadism, amenorrhea, dysmenorrhea, metrorrhagia, ovulation block and contraception, pregnancy maintenance, arteriosclerosis, osteoporosis, menopausal symptoms, infertility, functional uterine bleeding, and the like.

The novel compounds of the invention when contemplated for use in pharmaceutical products may be employed in combination, if desired, with a large number of compatible diluents, carriers and the like to form a pharmaceutical composition. Such liquid carriers as mineral oil or a lower aliphatic alcohol may be used where injectables are to be prepared. Glycerine or the like may be used where a syrup is to be used to administer the compound. Carboxymethylcellulose, starches, sugars and the like may be employed where tablets or powders are to be employed as a means of administration. The dosage of the compounds will vary with the severity of the ailment and in general can vary from 0.5 to 100 mg./kilo of body weight per day depending upon the many factors of the case involved.

The invention will be further illustrated by the several following examples of preparation of selected members of the series. It is, of course, to be understood that these examples are purely by way of illustration and are not intended to limit the scope of the invention in any manner. For a legal definition of the proper scope of the invention attention may only be directed to the several appended claims.

EXAMPLE I

*3-(2-propynyloxy)estra-1,3,5(10)-trien-17-one*

Four grams of estrone, 3.3 g. of potassium hydroxide, 3.6 ml. of 3-bromopropyne and 75 ml. of methanol were refluxed overnight after which time additional alkali and 3-bromopropyne were added. The mixture was refluxed for six hours more with additions of alkali to maintain the pH at 8–9 and with additions of 3-bromopropyne. The mixture was then cooled and filtered. The crystalline material was washed with methanol, dissolved in benzene, and washed with water, after which the benzene solution was dried over anhydrous sodium sulfate and evaporated. The residue was slurried in methanol and filtered, thus yielding 3.4 g. of crystalline 3-(2-propynyloxy)estra-1,3,5(10)-trien-17-one which was recrystallized from methanol, M.P. 146–149°;

$\lambda_{max.}^{KBr}$ 4.73, 5.75, 6.23, 6.33, 6.67$\mu$, etc.

*Analysis.*—Calc. for $C_{21}H_{24}O_2$: C, 81.78; H, 7.84. Found: C, 81.64; H, 7.57.

EXAMPLE II

*3-(2-propynyloxy)estra-1,3,5(10)-trien-17-one cyclic ethylene ketal*

A mixture of 3.5 g. of 3-(2-propynyloxy)estra-1,3,5(10)-trien-17-one, 0.3 g. of p-toluenesulfonic acid monohydrate, 30 ml. of ethylene glycol, and 200 ml. of toluene was refluxed with a Dean-Stark apparatus for the removal of water. After six hours, the mixture was cooled, washed with saturated aqueous sodium bicarbonate solution, and the layers were separated. The benzene layer was dried and evaporated. The resulting oil was crystallized from methanol and recrystallized several times from methanol, yielding the pure product, M.P. 99–101°;

$\lambda_{max.}^{KBr}$ 4.73, 6.20, 6.30, 6.65$\mu$, etc.

*Analysis.*—Calc. for $C_{23}H_{28}O_3$: C, 78.37; H, 8.01. Found: C, 78.28; H, 7.98.

In a manner similar to the above preparation the compound 3-(3-butynyloxy)estra-1,3,5(10)-trien-17-one cyclic ethylene acetal is prepared from the starting material intermediate 3-(3-butynyloxy)estra - 1,3,5(10) - trien-17- one. The starting material is made as in Example I by substitution of 4-halo butyne for the 3-bromopropyne of that example.

EXAMPLE III

*17,17-ethylenethioxy-3-(2-propynyloxy)estra-1,3,5-(10)-trien*

Reflux for four hours a solution of 5.0 g. of 3-(2-propynyloxy)estra-1,3,5(10)-trien-17-one, 0.3 g. of p-toluenesulfonic acid monohydrate, 5 ml. of 2-mercaptoethanol and 800 ml. of benzene with continuous separation of water. Cool the solution, wash with an aqueous sodium bicarbonate solution. Dry the organic layer over magnesium sulfate and evaporate in vacuo to obtain the product of the example.

EXAMPLE IV

*17,17-ethylenedithio-3-(2-propynyloxy)estra-1,3,5-(10)-trien*

Stir and cool to 5° a mixture of 5.0 g. of 3-(2-propynyloxy)estra-1,3,5(10)-trien-17-one, 5 ml. of ethanedithiol and 100 ml. of chloroform. Slowly bubble hydrogen chloride into this cold mixture for 3.5 hours. During this time the steroid will gradually dissolve. Evaporate the solution in vacuo to obtain the product of this example.

We claim:

1. A compound of the structure:

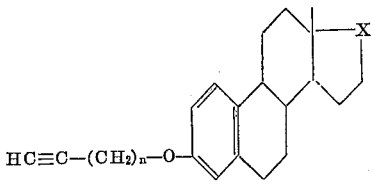

wherein X represents a member selected from the group consisting of lower alkylenedioxymethylene, lower alkylenethioxymethylene and lower alkylenedithiomethylene and $n$ represents a positive integer from 1 to 3.

2. 3-(2-propynyloxy)estra - 1,3,5(10) - trien - 17 - one cyclic ethylene ketal.

3. 3-(3-butynyloxy)estra - 1,3,5(10) - trien - 17 - one cyclic ethylene ketal.

References Cited by the Examiner

UNITED STATES PATENTS

| | | | |
|---|---|---|---|
| 2,855,411 | 10/1958 | Mueller | 260—397.4 |
| 2,949,476 | 8/1960 | Tyner | 260—397.5 |
| 3,002,009 | 9/1961 | Huffman | 260—397.5 |
| 3,137,709 | 6/1964 | Huffman | 260—397.4 |

LEWIS GOTTS, *Primary Examiner.*

HENRY A. FRENCH, *Assistant Examiner.*